United States Patent
Hong et al.

(10) Patent No.: US 9,450,254 B2
(45) Date of Patent: Sep. 20, 2016

(54) GAS DIFFUSION LAYER FOR FUEL CELL VEHICLE WITH IMPROVED OPERATIONAL STABILITY

(75) Inventors: Bo Ki Hong, Seoul (KR); Kook Il Han, Seoul (KR); Sang Yeoul Ahn, Seoul (KR); Keun Je Lee, Gyeonggi-do (KR); Byeong Heon Jeong, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 1015 days.

(21) Appl. No.: 12/543,361

(22) Filed: Aug. 18, 2009

(65) Prior Publication Data

US 2010/0129696 A1 May 27, 2010

(30) Foreign Application Priority Data

Nov. 25, 2008 (KR) .......................... 10-2008-0117247

(51) Int. Cl.
*H01M 8/0245* (2016.01)
*H01M 8/0234* (2016.01)
(Continued)

(52) U.S. Cl.
CPC ......... *H01M 8/0245* (2013.01); *H01M 4/8807* (2013.01); *H01M 8/0234* (2013.01); *H01M 2008/1095* (2013.01); *Y02E 60/50* (2013.01)

(58) Field of Classification Search
CPC ........... H04M 4/8807; H04M 8/0245; H04M 8/0234; H04M 2008/1095
See application file for complete search history.

(56) References Cited

U.S. PATENT DOCUMENTS

2005/0112449 A1* 5/2005 Mathias et al. .................. 429/44
2010/0028744 A1* 2/2010 Wieser et al. ................... 429/30

FOREIGN PATENT DOCUMENTS

JP          09-161801 A        6/1997
JP          2003-089968 A      3/2003
(Continued)

OTHER PUBLICATIONS

X. L. L Wang et al., Micro-porous layer with composite carbon black for PEM fuel cells, Jan. 17, 2006, Electrochimica Acta 51, pp. 4909-4915.*
(Continued)

*Primary Examiner* — Barbara Gilliam
*Assistant Examiner* — Angela Martin
(74) *Attorney, Agent, or Firm* — Mintz Levin Cohn Ferris Glovsky and Popeo, P.C.; Peter F. Corless

(57) ABSTRACT

The present invention provides a gas diffusion layer for a fuel cell vehicle with improved operational stability, the gas diffusion layer, which functions to supply hydrogen and air (oxygen) as reactant gases to a fuel cell stack, discharge product water generated by an electrochemical reaction, and transmit generated electricity, being formed with a thinned structure.
For this purpose, the present invention provides a gas diffusion layer for a fuel cell vehicle with improved operational stability, the gas diffusion layer being formed with a dual layer structure including a microporous layer and a macroporous substrate, the macroporous substrate being formed of a material selected from the group consisting of carbon fiber felt and carbon fiber paper, the gas diffusion layer being thinned to have a thickness of 200 to 300 μm at 25 kPa and a thickness of 170 to 250 μm at 1 MPa, a density of 0.20 to 0.60 g/cm$^3$ at 25 kPa, a porosity of 50 to 90% measured by mercury intrusion, and a through-plane electrical resistance of 30 mΩ·cm$^2$ or lower measured at a clamping pressure of 1 MPa.

4 Claims, 5 Drawing Sheets

(51) Int. Cl.
  *H01M 8/02*   (2016.01)
  *H01M 4/88*   (2006.01)
  *H01M 8/10*   (2016.01)

(56) References Cited

FOREIGN PATENT DOCUMENTS

| JP | 2007-207486 A | 8/2007 | | |
|---|---|---|---|---|
| JP | 2008-084538 | 4/2008 | | |
| KR | 10-2006-0117474 A | 11/2006 | | |
| KR | 1020060117474 | * | 3/2007 | ............ H01M 4/86 |

OTHER PUBLICATIONS

David P. Wilkinson et al., Proton Exchange Membrane Fuel Cells: Materials Properties and Performance, Nov. 24, 2009, CRC Press, pp. 248-276. (https://books.google.com/books?isbn=1439806667).*

* cited by examiner

GAS DIFFUSION LAYER FOR FUEL CELL VEHICLE WITH IMPROVED OPERATIONAL STABILITY

CROSS-REFERENCE TO RELATED APPLICATION

This application claims under 35 U.S.C. §119(a) the benefit of Korean Patent Application No. 10-2008-0117247 filed Nov. 25, 2008, the entire contents of which are incorporated herein by reference.

BACKGROUND (a) Technical Field

The present disclosure relates to a gas diffusion layer for a fuel cell with improved operational stability.

(b) Background Art

One of the electrolyte membrane for use in a fuel cell vehicle is a polymer electrolyte membrane fuel cell (PEMFC). The PEMFC needs to stably operate over a wide current density range such that it may exhibit a high-power performance of at least several tens of kW under various operational conditions of the vehicle [S. Park, J. Lee, and B. N. Popov, J. Power Sources, 177, 457 (2008)].

A fuel cell generates electricity through an electrochemical reaction between hydrogen and oxygen. Hydrogen supplied to an anode (oxidation electrode) of the fuel cell is dissociated into hydrogen ions and electrons. The hydrogen ions are transmitted to a cathode (reduction electrode) through a polymer electrolyte membrane, and the electrons are transmitted to the cathode through an external circuit. At the cathode, the hydrogen ions and electrons react with oxygen (air) to generate electricity and heat and, at the same time, produce water as a by-product.

If the water is produced in an appropriate amount during the electrochemical reaction, it may function to maintain the humidity of the membrane electrode assembly (MEA). On the other hand, if the water is produced excessively and is not appropriately removed, flooding occurs at high current density, preventing the reactant gases from being sufficiently supplied into the fuel cell and thereby increasing voltage loss.

For example, especially when high power is required during operation of the fuel cell vehicle, if the reactant gases are not sufficiently supplied to the fuel cell by the flooding phenomenon, it is difficult for the vehicle to be stably operated. Accordingly, it is important to properly remove water produced by the electrochemical reaction of the fuel cell.

FIG. 1 is a schematic diagram showing a configuration of a unit cell including gas diffusion layers.

A gas diffusion layer (GDL) 220 is attached to the outer surface of the catalyst layer 110 coated on a fuel electrode and another GDL 220 is attached to the outer surface of the catalyst layer 110 coated on an air electrode. A polymer electrolyte membrane 100 is disposed between the catalyst layers 100. The gas diffusion layers 220 function to supply reactant gases such as hydrogen and air (oxygen), transmit electrons produced by the electrochemical reaction, and discharge water produced by the reaction to minimize the flooding phenomenon in the fuel cell.

Commercially available gas diffusion layers have a dual layer structure including a microporous layer (MPL) 200 having a pore size of less than 1 μm when measured by mercury intrusion and a macroporous substrate (or backing) 210 having a pore size of 1 to 300 μm [X. L. Wang, H. M. Zhang, J. L. Zhang, H. F. Xu, Z. Q. Tian, J. Chen, H. X. Zhong, Y. M. Liang, B. L. Yi, Electrochimica Acta, 51, 4909 (2006)].

The performance of the fuel cell depends on various characteristics of the GDL including thickness, gas permeability, compressibility, degree of hydrophobicity, structure of carbon fiber, porosity/pore distribution, pore tortuosity, electrical resistance, and bending stiffness (Japanese Patent No. 3331703 B2).

The microporous layer 200 of the gas diffusion layer 220 is formed by mixing carbon powder such as carbon black, acetylene black carbon, and black pearl carbon with polytetrafluoroethylene (PTFE) hydrophobic agent and coating the mixture on one or both sides of the macroporous substrate 210.

If the pore structure and the hydrophobicity of the microporous layer 200 is properly controlled, it is possible to efficiently discharge the water produced by the electrochemical reaction of the fuel cell, smoothly supply the reactant gases, and minimize the electrical contact resistance with the catalyst layer 110.

Meanwhile, the macroporous substrate 210 of the gas diffusion layer 220 is generally composed of carbon fiber and PTFE hydrophobic agent and may be formed of carbon fiber cloth, carbon fiber felt, and carbon fiber paper [S. Escribano, J. Blachot, J. Etheve, A. Morin, R. Mosdale, J. Power Sources, 156, 8 (2006); M. F. Mathias, J. Roth, J. Fleming, and W. Lehnert, Handbook of Fuel Cells-Fundamentals, Technology and Applications, Vol. 3, Ch. 42, John Wiley & Sons (2003)].

The macroporous substrate 210 of the gas diffusion layer 220 is used as a physical support for the polymer electrolyte membrane 100 and the catalyst layer 110. It, like the microporous layer 200, plays an important role in the mass transport for the electrochemical reaction. Especially, the macroporous substrate 210 plays an important role in discharging the product water to prevent the flooding problem.

It is necessary to optimize the structural design of the gas diffusion layer for the fuel cell such that it provides high performance in various application field and operational conditions. In general, a carbon fiber, cloth fiber felt or carbon fiber is used to prepare such gas diffusion layer.

Meanwhile, since a large number of components are disposed in a limited space of a fuel cell vehicle, it is important that the components are miniaturized.

A conventional gas diffusion layer is difficult to provide a stable operation under abnormal operational conditions such as a shortage in hydrogen supply. Also, since it is thick, the degree of freedom of vehicle design is affected.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a gas diffusion layer for a fuel cell vehicle with improved operational stability, characterized in that the gas diffusion layer is formed with a dual layer structure including a microporous layer and a macroporous substrate, the gas diffusion layer has a thickness of 200 to 300 μm at 25 kPa and a thickness of 170 to 250 μm at 1 MPa, a density of 0.20 to 0.60 g/cm$^3$ at 25 kPa, a porosity of 50 to 90% measured by mercury intrusion, and a through-plane electrical resistance of 30 mΩ·cm$^2$ or lower measured at a clamping pressure of 1 MPa.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
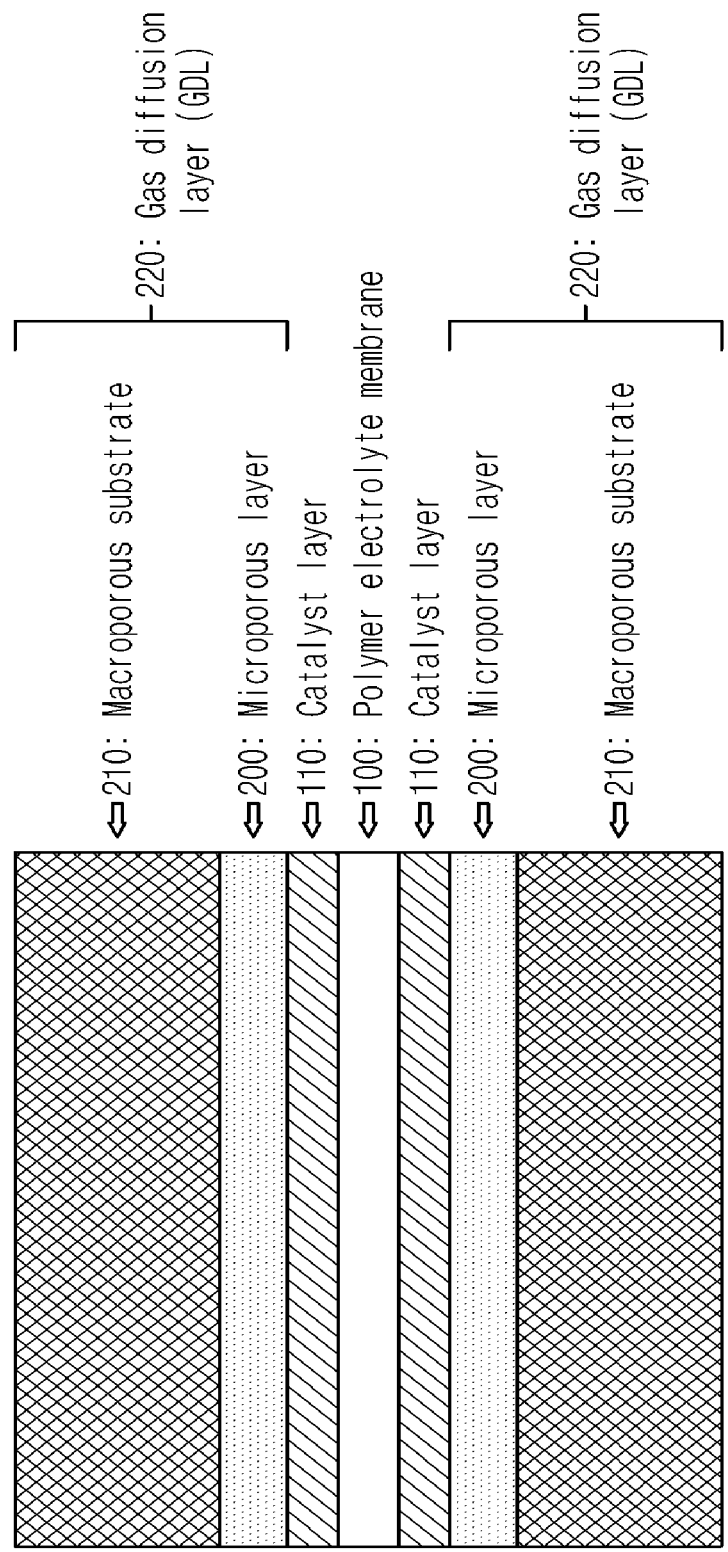
FIG. 1 is a schematic diagram showing a configuration of a unit cell.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention provides a thin gas diffusion layer for a fuel cell vehicle, which has a dual layer structure including a microporous layer and a macroporous substrate to provide excellent properties such as mass transport properties of reactant gases in a fuel cell, product water discharge properties, and electron migration properties, thus providing improved operational stability. Preferably, the macroporous substrate may be formed of carbon fiber felt, carbon fiber paper, or a combination thereof.

Suitably, the gas diffusion layer has a thickness of 200 to 300 μm at 25 kPa and a thickness of 170 to 250 μm at 1 MPa. More suitably, the gas diffusion layer has a thickness of 230 to 270 μm at 25 kPa and a thickness of 190 to 230 μm at 1 MPa. If the thickness of the gas diffusion layer is less than 200 μm at 25 kPa, the mechanical properties and handling properties are deteriorated and it is difficult to form the gas diffusion layer with a uniform thickness. On the other hand, if it exceeds 300 μm at 25 kPa, it is difficult to achieve a thinning effect.

Preferably, the gas diffusion layer has a density of 0.20 to 0.60 $g/cm^3$ at 25 kPa, more preferably, 0.35 to 0.50 $g/cm^3$. If the density of the gas diffusion layer is less than 0.20 $g/cm^3$, the handling properties are deteriorated and it thus is difficult to attach the gas diffusion layer to the fuel cell stack. By contrast, if it exceeds 0.60 $g/cm^3$, the mass transport properties is deteriorated.

Suitably, the gas diffusion layer has a porosity of 50 to 90%, more preferably 60 to 85% when measured by mercury intrusion porosimeter. If the porosity is lower than 50%, the mass transport properties of reactant gases and product water are deteriorated. In contrast, if it is higher than 90%, the mechanical properties and handling properties are deteriorated.

Preferably, the gas diffusion layer has a through-plane electrical resistance of 30 $m\Omega \cdot cm^2$ or lower, more preferably 20 $m\Omega \cdot cm^2$ or lower when measured at a clamping pressure of 1 MPa using conventional 2-probe method. If the through-plane electrical resistance is higher than 30 $m\Omega \cdot cm^2$, it is difficult for the electrons produced by the electrochemical reaction of the fuel cell to migrate smoothly.

In general, the microporous layer and the macroporous substrate of the gas diffusion layer are subjected to hydrophobic treatment using a hydrophobic material such as polytetrafluoroethylene, a polytetrafluoroethylene-based copolymer, and a polymer blend thereof so as to facilitate the removal of product water from the fuel cell. If there is a shortage of such hydrophobic material, the discharge of the product water is not facilitated; by contrast, if it is used too much, the electrical resistance of the gas diffusion layer is increased, thus preventing the migration of electrons and, further, the porosity is significantly reduced, thus impeding the mass transport of reactant gases and product water.

The following examples illustrate the invention and are not intended to limit the same.

EXAMPLE

A carbon fiber felt based gas diffusion layer was prepared by using a conventional method such that the gas diffusion layer has a thickness of 250 μm at a pressure of 25 kPa, a density of 0.40 $g/cm^3$ at a pressure of 25 kPa, a porosity of 70% when measured by mercury intrusion porosimeter, and a through-plane resistance of 10 $m\Omega \cdot cm^2$ at 1 MPa.

Comparative Example

A conventional felt thick gas diffusion layer (GDL-1) was selected, which has a thickness of 420 μm at 25 kPa and a thickness of 350 μm at 1 MPa.

Test Example

The electrochemical performance of the gas diffusion layer according to the Example and the electrochemical performance of the gas diffusion layer according to the Comparative Example were evaluated. In order to evaluate the electrochemical performance of the gas diffusion layers, the other components such as polymer electrolyte membranes, catalyst layers, bipolar plates, and clamping members were assembled in the same manner and maintained.

The electrochemical performances of the fuel cells having the gas diffusion layers according to the Example and the Comparative Example were compared by measuring potential-current density polarization characteristics based on six fuel cells, and commercially available equipment was used for the measurement and evaluation.

The conditions given during the measurement of electrochemical performances were as follows:
Temperature at fuel cell inlet: 65° C.
Gas pressure: near ambient pressure
Relative humidity (RH) at anode and cathode: 100%/100% or 50%/50%
Stoichiometric ratio (SR) of anode hydrogen to cathode air: 1.5/2.0

The electrochemical performances were evaluated under the above conditions during normal operation and during a shortage of hydrogen, as described below.

1) Electrochemical Performance During Normal Operation

Figure 2:
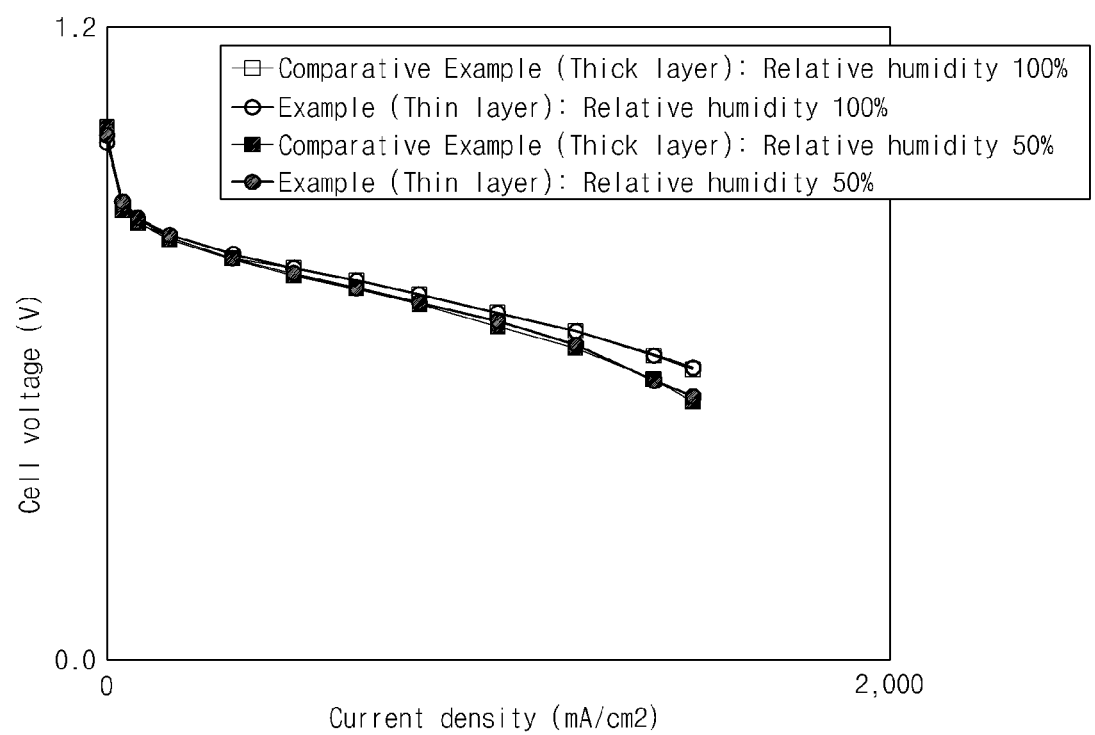
FIG. 2 is a graph comparing the electrochemical performance of a thin gas diffusion layer according to Example of the present invention with that of a conventional thick gas diffusion layer according to Comparative Example under standard operational conditions of a fuel cell.

At relative humidities of 100%/100% and 50%/50%, the electrochemical performance of the thin gas diffusion layer according to the Example and that of the conventional thick gas diffusion layer according to the Comparative Example were compared under standard operational conditions of the fuel cell, and the results are shown in FIG. 2.

The electrochemical performance of the thin gas diffusion layer according to the Example was equivalent to that of the conventional thick gas diffusion layer according to the Comparative Example, which implies that the thin gas diffusion layer was well designed to exhibit the electrochemical performance equivalent to that of the conventional thick gas diffusion layer.

2) Electrochemical Performance During a Shortage in Hydrogen Supply

As described above, when the fuel cell vehicle is operated under various operational conditions, (fuel) hydrogen may be excessively or insufficiently supplied to the anode by an unexpected situation. If the hydrogen supply is exhausted, the output performance of the fuel cell stack is severely degraded, thus not providing a stable operation of the vehicle. Therefore, it is necessary to reproduce and evaluate stable operation performance of the fuel cell under abnormal operational conditions such as a shortage in hydrogen supply.

Figure 3:
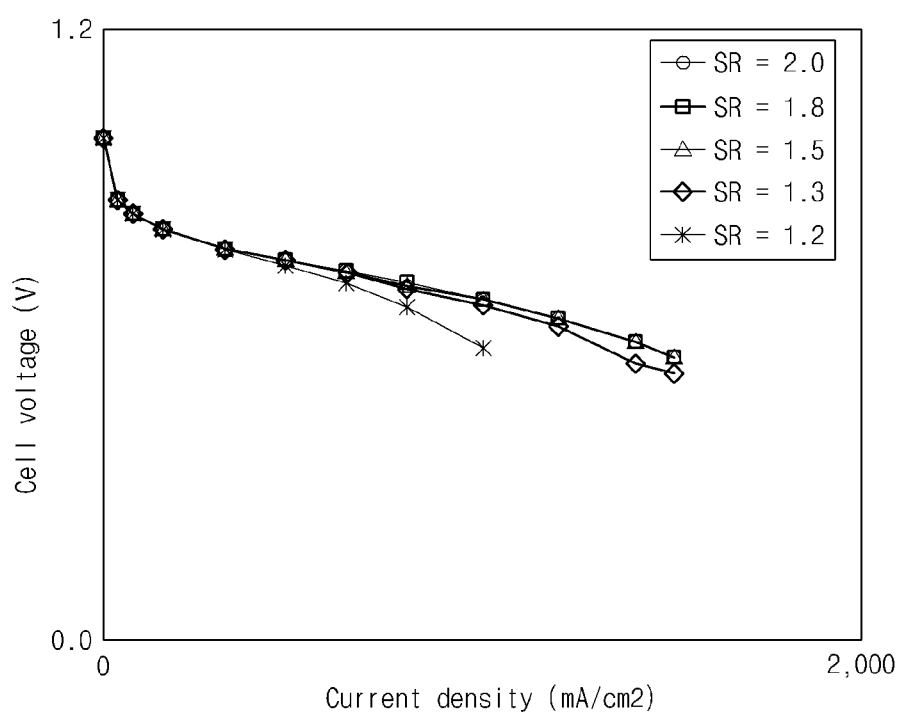
FIG. 3 is a graph showing the electrochemical performance of a conventional thick gas diffusion layer according to a change in the stoichiometric ratio of hydrogen.
Figure 4:
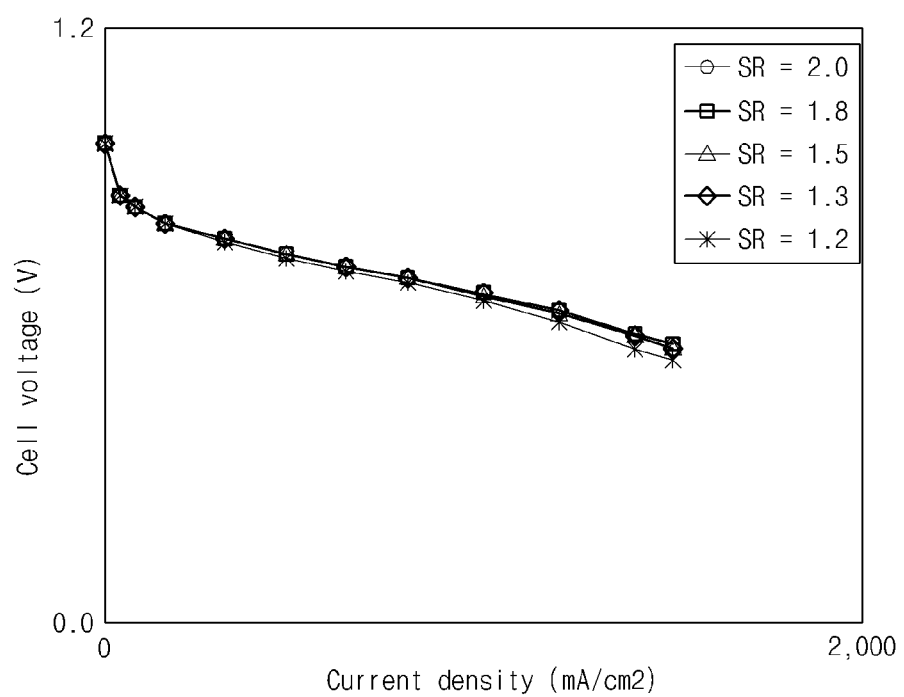
FIG. 4 is a graph showing the electrochemical performance of a thin gas diffusion layer of the present invention according to a change in the stoichiometric ratio of hydrogen.

To reproduce such a situation, while the SR of the cathode air was set to 2.0, and the SR of the anode hydrogen was gradually reduced from 2.0 to 1.2, the changes in the electrochemical performance of the conventional thick gas diffusion layer according to the Comparative Example and that of the thin gas diffusion layer according to the Example were observed, and the results are shown in FIGS. 3 and 4, respectively.

As shown in FIG. 3, in case of the conventional thick gas diffusion layer according to the Comparative Example, while virtually no decrease in the electrochemical performance occurred until the SR of the anode hydrogen was reduced from 2.0 to 1.5, a severe decrease in the electrochemical performance occurred when the SR of the anode hydrogen was less than 1.3. It was difficult to provide a stable operation of the fuel cell at high current density when the SR of the anode hydrogen was 1.2.

On the contrary, as shown in FIG. 4, in case of the thin gas diffusion layer according to the Example, while virtually no decrease in the electrochemical performance occurred even if the SR of the anode hydrogen was reduced from 2.0 to 1.3. Notably, it was possible to provide a stable operation of the fuel cell at high current density even if the SR of the anode hydrogen was as low as 1.2. This indicates that when the hydrogen is not smoothly supplied to the fuel cell stack due to an unexpected situation occurring in a hydrogen storage system in the fuel cell vehicle, the thin gas diffusion layer of the present invention having a low diffusion thickness can stably operate the fuel cell vehicle compared to the conventional thick gas diffusion layer.

Figure 5:
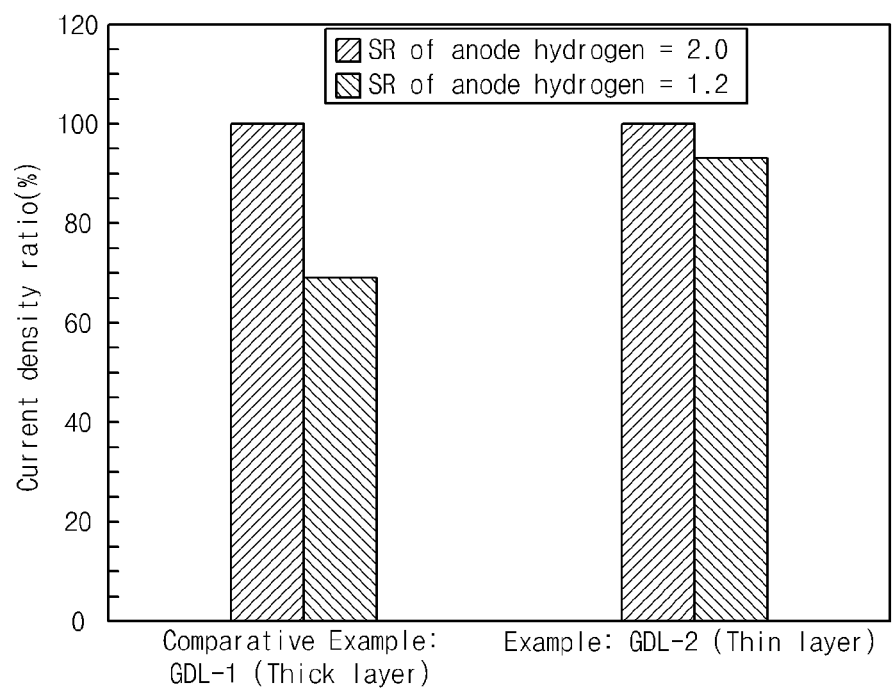
FIG. 5 is a graph comparing the electrochemical performance of a thin gas diffusion layer according to Example of the present invention with that of a conventional thick gas diffusion layer according to Comparative Example.

Meanwhile, in order to quantify the degree of performance deterioration according to the shortage in hydrogen supply, assuming that the current density at 0.6 V was 100% when the SR of the anode hydrogen was 2.0, the ratios of current density at 0.6 V when the SR of the anode hydrogen was 1.2 were measured for the thin gas diffusion layers according to the Example and the Comparative Example, and the results are shown in FIG. 5.

As shown in FIG. 5, as the SR of the anode hydrogen was reduced from 2.0 to 1.2, the current density of the thick gas diffusion layer according to the Comparative Example was reduced about 30%; by contrast, the current density of the thin gas diffusion layer according to the Example was reduced about 7%. This indicates that the thin gas diffusion layer according to the Example is more suitable for stable operation of the fuel cell.

According to the present invention, it is possible to stabilize the electrochemical performance during a shortage in hydrogen supply compared to the conventional thick gas diffusion layer. Moreover, it is possible to reduce the overall length of the fuel cell stack, thus increasing the efficiency of vehicle package design. Furthermore, it is possible to increase the vehicle power by stacking additional unit cells in proportion to the reduced length of the fuel cell stack.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A gas diffusion layer incorporated in a fuel cell vehicle, characterized in that the gas diffusion layer is formed with a dual layer structure including a microporous layer and a macroporous substrate, the gas diffusion layer has a thickness of 200 to 300 μm at 25 kPa and a thickness of 170 to 250 μm at 1 MPa, a density of 0.20 to 0.60 g/cm$^3$ at 25 kPa, a porosity of 50 to 90% measured by mercury intrusion porosimeter, and a through-plane electrical resistance of 30 mΩ·cm$^2$ or lower measured at a clamping pressure of 1 MPa wherein the porosity of the gas diffusion layer is 60 to 85%, wherein the macroporous substrat is formed of carbon fiber felt, carbon fiber paper or combination thereof, and wherein the microporous layer is formed by mixing carbon powder with polytertrafluoroethylene (PTFE) hydrophobic agent and coating the mixture on one or both sides of the macroporous substrate, and the carbon power is carbon black, acetylene black carbon, or black pearl carbon.

2. The gas diffusion layer of claim 1, wherein the gas diffusion layer has a thickness of 230 to 270 μm at 25 kPa and at 190 to 230 μm at 1 MPa.

3. The gas diffusion layer of claim 1, wherein the gas diffusion layer has a density of 0.35 to 0.50 g/cm$^3$ at 25 kPa.

4. The gas diffusion layer of claim 1, wherein the through-plane electrical resistance of the gas diffusion layer is 20 mΩ·cm$^2$ or lower.

* * * * *